United States Patent
Sohn et al.

(10) Patent No.: US 11,520,923 B2
(45) Date of Patent: Dec. 6, 2022

(54) PRIVACY-PRESERVING VISUAL RECOGNITION VIA ADVERSARIAL LEARNING

(71) Applicant: NEC Laboratories America, Inc., Princeton, NJ (US)

(72) Inventors: Kihyuk Sohn, Fremont, CA (US); Manmohan Chandraker, Santa Clara, CA (US); Yi-Hsuan Tsai, San Jose, CA (US)

(73) Assignee: NEC Corporation

( * ) Notice: Subject to any disclaimer, the term of this patent is extended or adjusted under 35 U.S.C. 154(b) by 608 days.

(21) Appl. No.: 16/674,425

(22) Filed: Nov. 5, 2019

(65) Prior Publication Data

US 2020/0143079 A1    May 7, 2020

Related U.S. Application Data (60) Provisional application No. 62/878,786, filed on Jul. 26, 2019, provisional application No. 62/756,765, filed on Nov. 7, 2018.

(51) Int. Cl.
| | |
|---|---|
| *G06F 21/62* | (2013.01) |
| *G06N 3/04* | (2006.01) |
| *G06N 3/08* | (2006.01) |

(52) U.S. Cl.
CPC ....... *G06F 21/6245* (2013.01); *G06N 3/0454* (2013.01); *G06N 3/08* (2013.01)

(58) Field of Classification Search
CPC .... G06F 21/6245; G06N 3/0454; G06N 3/08; G06N 3/0472; G06N 3/084
USPC ......................................................... 726/26
See application file for complete search history.

(56) References Cited

U.S. PATENT DOCUMENTS

| | | | |
|---|---|---|---|
| 8,555,400 | B2 | 10/2013 | Shi et al. |
| 8,639,947 | B2 | 1/2014 | Elovici et al. |
| 8,667,292 | B2 | 3/2014 | Danezis et al. |
| 8,848,924 | B2 | 9/2014 | Kohno et al. |
| 9,324,022 | B2 | 4/2016 | Williams, Jr. et al. |
| 2017/0372193 | A1 | 12/2017 | Mailhe et al. |

*Primary Examiner* — Thierry L Pham
(74) *Attorney, Agent, or Firm* — Joseph Kolodka (57) ABSTRACT

A method for protecting visual private data by preventing data reconstruction from latent representations of deep networks is presented. The method includes obtaining latent features from an input image and learning, via an adversarial reconstruction learning framework, privacy-preserving feature representations to maintain utility performance and prevent the data reconstruction by simulating a black-box model inversion attack by training a decoder to reconstruct the input image from the latent features and training an encoder to maximize a reconstruction error to prevent the decoder from inverting the latent features while minimizing the task loss.

20 Claims, 8 Drawing Sheets

Adversarial Reconstruction Learning Framework

Utility Loss

$$\mathcal{L}_u = \mathbb{E}_{\{(X \in \mathcal{X}_1, Y)\}}[\mathcal{L}(f(Z), Y)]$$

Reconstruction Loss

$$\mathcal{L}_p = \mathbb{E}_{\{(X \in \mathcal{X}_1, Z)\}}[\|\text{Dec}(Z) - X\|^2]$$

Perceptual Similarity Loss

$$\mathcal{L}_{\text{perc}} = \mathbb{E}_{\{(X \in \mathcal{X}_1, Z)\}}[\|g(\text{Dec}(Z)) - g(X)\|^2]$$

Training Objective of Protector

$$\min_{\text{Enc}, f} \mathcal{L}_u - \lambda_1 \mathcal{L}_p - \lambda_2 \mathcal{L}_{\text{perc}}$$

FIG. 8

PRIVACY-PRESERVING VISUAL RECOGNITION VIA ADVERSARIAL LEARNING

RELATED APPLICATION INFORMATION

This application claims priority to Provisional Application No. 62/756,765, filed on Nov. 7, 2018, and Provisional Application No. 62/878,786, filed on Jul. 26, 2019, the contents of which are incorporated herein by reference in their entirety.

BACKGROUND

Technical Field

The present invention relates to visual recognition systems and, more particularly, to privacy-preserving visual recognition via adversarial learning.

Description of the Related Art

As machine learning (ML) algorithms powered by deep neural networks and large data have demonstrated an impressive performance in many areas across natural language, speech, and computer vision, there have been increased interests in ML-as-a-service cloud services. These systems demand frequent data transmissions between service providers and their customers to train ML models, or users to evaluate their data. For example, customers who want to develop face recognition systems may share the set of images including people of interest with cloud service providers (CSPs). Facial expression based recommendation system may ask users to upload photos. However, these processes can be exposed to privacy risks. Data containing the confidential information shared from the customers can be, e.g., misused by the CSPs or acquired by an adversary.

SUMMARY

A computer-implemented method for protecting visual private data by preventing data reconstruction from latent representations of deep networks is presented. The method includes obtaining latent features from an input image and learning, via an adversarial reconstruction learning framework, privacy-preserving feature representations to maintain utility performance and prevent the data reconstruction by simulating a black-box model inversion attack via training a decoder to reconstruct the input image from the latent features and training an encoder to maximize a reconstruction error to prevent the decoder from inverting the latent features while minimizing the task loss.

A non-transitory computer-readable storage medium comprising a computer-readable program is presented for protecting visual private data by preventing data reconstruction from latent representations of deep networks, wherein the computer-readable program when executed on a computer causes the computer to perform the steps of obtaining latent features from an input image and learning, via an adversarial reconstruction learning framework, privacy-preserving feature representations to maintain utility performance and prevent the data reconstruction by simulating a black-box model inversion attack by training a decoder to reconstruct the input image from the latent features and training an encoder to maximize a reconstruction error to prevent the decoder from inverting the latent features while minimizing the task loss.

A system for protecting visual private data by preventing data reconstruction from latent representations of deep networks is presented. The system includes a memory and one or more processors in communication with the memory configured to obtain latent features from an input image and learn, via an adversarial reconstruction learning framework, privacy-preserving feature representations to maintain utility performance and prevent the data reconstruction by simulating a black-box model inversion attack by training a decoder to reconstruct the input image from the latent features and training an encoder to maximize a reconstruction error to prevent the decoder from inverting the latent features while minimizing the task loss.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention identify how to learn a privacy-preserving and task-oriented deep representation. The exemplary embodiments focus on a defense against a black-box model inversion attack, where adversaries are permitted to make unlimited inferences of their own data to recover input from acquired features of private customer and user data. As an adversary, the exemplary embodiments consider a model inversion (MI) attack based on the neural decoder that is trained to reconstruct the data using data-feature pairs. Perceptual and generative adversarial network (GAN) losses are employed to improve the generation quality. Finally, the exemplary embodiments identify adversarial data reconstruction learning that involves an alternate training of an encoder and a decoder. While the decoder, simulating the adversary's attack, is trained to reconstruct input from the feature, the encoder is trained to maximize the reconstruction error to prevent the decoder from inverting features while minimizing the task loss.

The exemplary embodiments identify the vulnerability of deep networks against the MI attacks in the context of facial attribute analysis with extensive experimental results. The exemplary embodiments illustrate that it is difficult to invert the adversarially learned features, and, thus, the proposed methods successfully defend against strong inversion attacks.

The exemplary embodiments thus identify adversarial data reconstruction learning to defend against black-box model inversion attacks, along with a few strong attack methods based on the neural decoder. The exemplary embodiments further demonstrate the vulnerability of standard deep features and the effectiveness of the features learned with the exemplary method in preventing data reconstruction. The exemplary embodiments further illustrate the utility-privacy trade-off with different choice of hyper-parameter for negative perceptual similarity loss and illustrate the impact on the privacy protection with different layers of features, tasks, and data for decoder training.

Before introducing the privacy-preserving feature learning method of the exemplary embodiments of the present invention, the privacy attack methods of the adversary are laid out in detail.

To design a proper defense mechanism, the exemplary embodiments first need to understand an adversary's attack method. As a result, the exemplary embodiments focus on a model inversion (MI) attack, where the goal of the adversary is to invert features back to an input. The exemplary embodiments further assume a black-box attack, where the adversary has unlimited access to the model's inference (Enc), but not the model parameters. This is a generous setting to the adversary since the adversary can create a large-scale paired database of input $X \in \chi_2$ and the feature $Z = \text{Enc}(X)$.

Here, the exemplary embodiments use $\chi_2$ to distinguish the adversary's own dataset from the private training dataset $\chi_1$ of CSPs or their customers.

Given a paired dataset $\{(X \in \chi_2, Z)\}$, the adversary inverts the feature via a decoder $\text{Dec}^a: \mathcal{Z} \to X$, which is trained to reconstruct the input X from the feature Z by minimizing the reconstruction loss:

$$\mathcal{L}_p^a = \mathbb{E}_{\{(X \in \chi_2, Z)\}}[\|\hat{X} - X\|^2], \qquad (1)$$

where $\hat{X} = \text{Dec}^a(Z)$. Note that the above does not involve backpropagation through an encoder (Enc). The inversion quality may be improved with the generative adversarial network (GAN) loss:

$$\mathcal{L}_{adv}^a = \mathbb{E}_Z[\log(1 - D(\hat{X}))], \qquad (2)$$

where D is the discriminator, distinguishing the generated images from the real ones by maximizing the following loss:

$$\mathcal{L}_D^a = \mathbb{E}_{X \in \chi_2}[\log(1 - D(X)) + \log(D(\hat{X}))]. \qquad (3)$$

The exemplary embodiments can further improve the inversion quality by minimizing the perceptual similarity:

$$\mathcal{L}_{perc}^a = \mathbb{E}_{\{(X \in \chi_2, Z)\}}[\|g(\text{Dec}^a(Z)) - g(X)\|^2], \qquad (4)$$

where the method uses the conv1 to conv5 layers of a VGG neural network pre-trained on the ImageNet for g.

The overall training objective of an adversary thus can be written as:

$$\begin{cases} \min_{Dec^a} \mathcal{L}_p^a + \mu_1 \mathcal{L}_{adv}^a + \mu_2 \mathcal{L}_{perc}^a, \\ \max_D \mathcal{L}_D^a. \end{cases} \qquad (5)$$

Realizing the attack types, the exemplary embodiments are now ready to identify the training objective of privacy-preserving and task-oriented representation.

To learn a task-oriented representation, the exemplary embodiments adopt a multilayer perceptron (MLP) classifier f that predicts the utility label Y from Z by minimizing the utility loss:

$$\mathcal{L}_u = \mathbb{E}_{\{(X \in \chi_1, Y)\}}[(\mathcal{L}_{f(Z), Y})], \qquad (6)$$

where $f(Z) = f(\text{Enc}(X))$, Y is the ground-truth label for utility, and $\mathcal{L}$ is the standard loss (e.g., cross-entropy) for utility.

Note that $\chi_1$ is private training data, which is not accessible to the adversary.

To learn a privacy-preserving feature against the MI attack, an Enc needs to output Z that cannot be reconstructed into an input X by any decoder. However, enumerating all possible decoders is not feasible.

Instead, the exemplary embodiments employ adversarial learning. Specifically, the decoder (Dec) is trained to compete against an Enc in a way that it learns to decode Z of the current Enc into X by minimizing the reconstruction loss:

$$\mathcal{L}_p = \mathbb{E}_{\{(X \in \chi_1, Z)\}}[\|\text{Dec}(Z) - X\|^2]. \qquad (7)$$

In addition, the quality of reconstruction can be improved, thus resulting in a stronger adversary, by using perceptual similarity loss as given by:

$$\mathcal{L}_{perc} = \mathbb{E}_{\{(X \in \chi_1, Z)\}}[\|g(\text{Dec}(Z)) - g(X)\|^2]. \qquad (8)$$

On the other hand, an Enc aims to fool or trick the Dec by maximizing the reconstruction loss or perceptual similarity loss.

Finally, the overall training objective of a protector is:

$$\min_{Enc, f} \mathcal{L}_u - \lambda_1 \mathcal{L}_p - \lambda_2 \mathcal{L}_{perc}, \qquad (9)$$

where the decoder Dec is updated by the same loss function as $\text{Dec}^a$.

Figure 4:
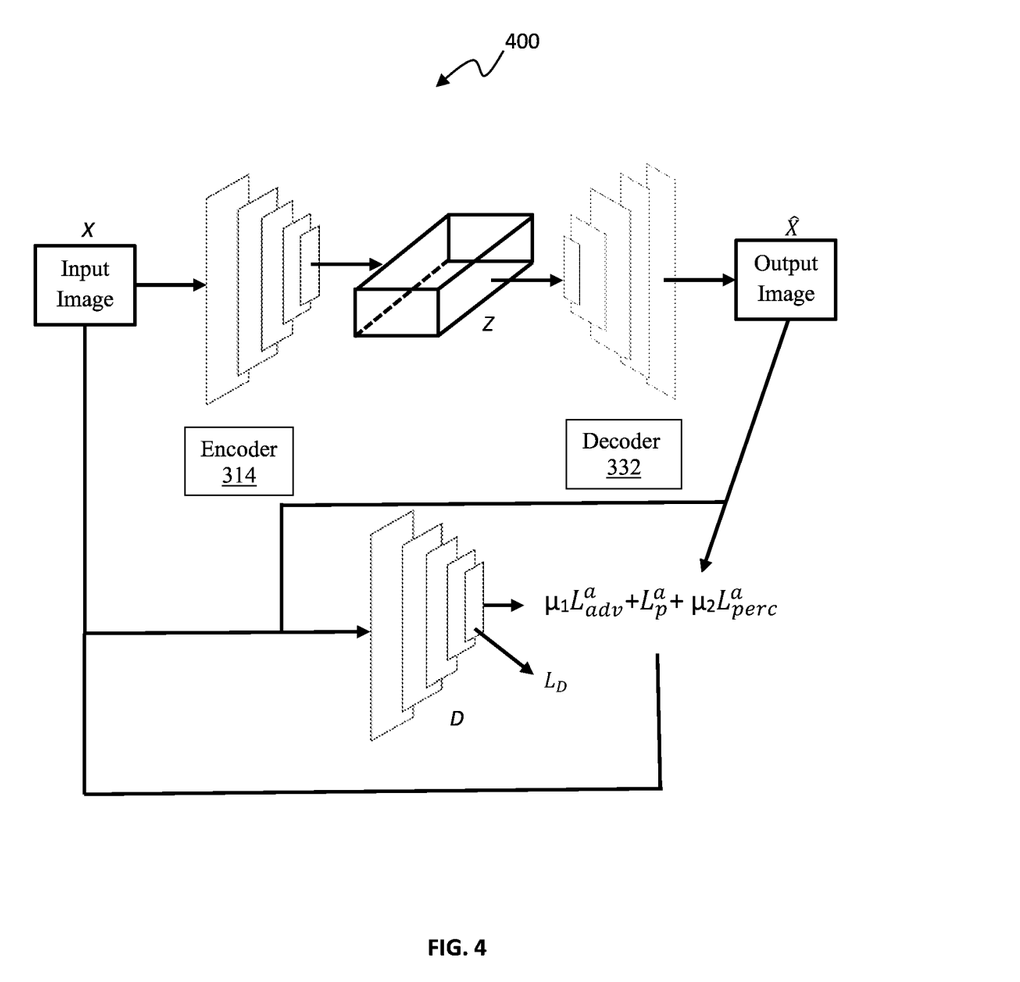
FIG. 4 is a block/flow diagram illustrating updating the decoder and D by using $X \in X_2$ while fixing the encoder and f, in accordance with embodiments of the present invention.
Figure 5:
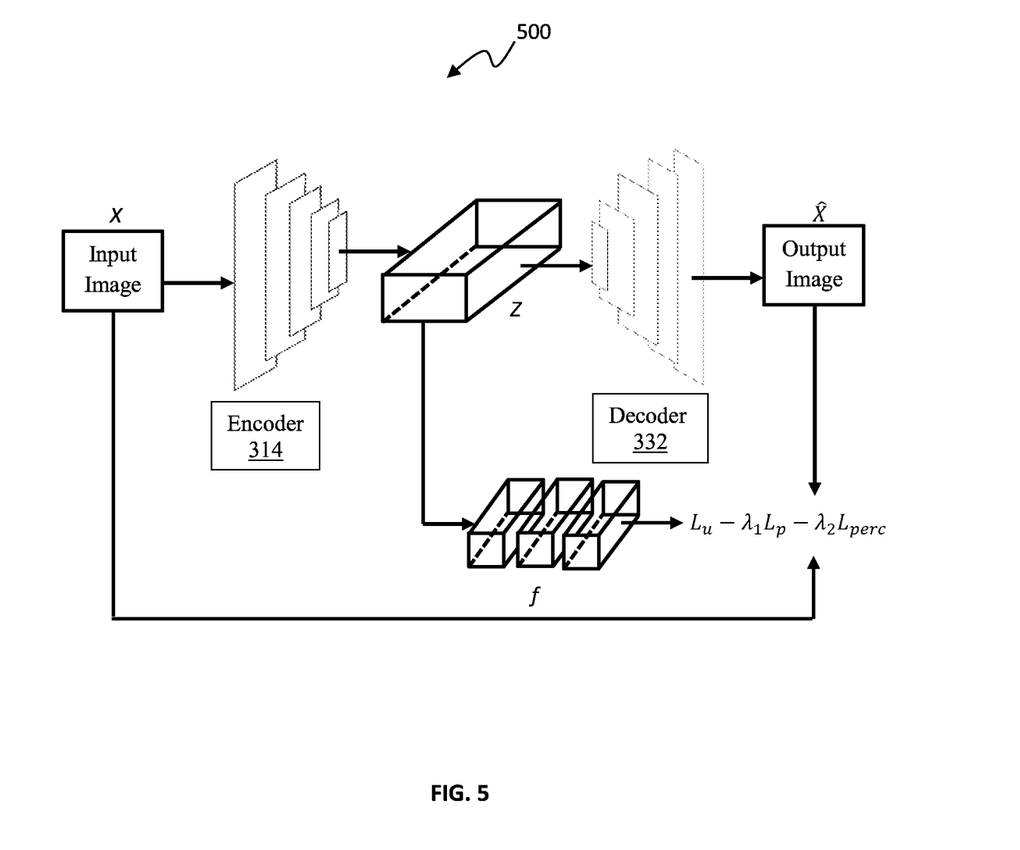
FIG. 5 is a block/flow diagram illustrating updating the encoder and f by using $X \in X_1$ while fixing the decoder, in accordance with embodiments of the present invention.

FIGS. 4 and 5, described in further detail below, depict the main modules of the exemplary embodiments. The exemplary embodiments adopt an alternative update strategy for the proposed learning framework. The $\text{Dec}^a$ and D are updated first on the public data $\chi_2$ according to (5) whiling fixing the Enc and f, and Enc and f are updated on the private data by (9) and so forth until convergence.

In contrast to conventional systems and methods, the exemplary embodiments can scale up to high-dimensional image data, learn image representations as the alternative of raw images, and maintain the utility performance to some extent, and protect the learned representations from being hacked via adversarial learning.

Figure 1:
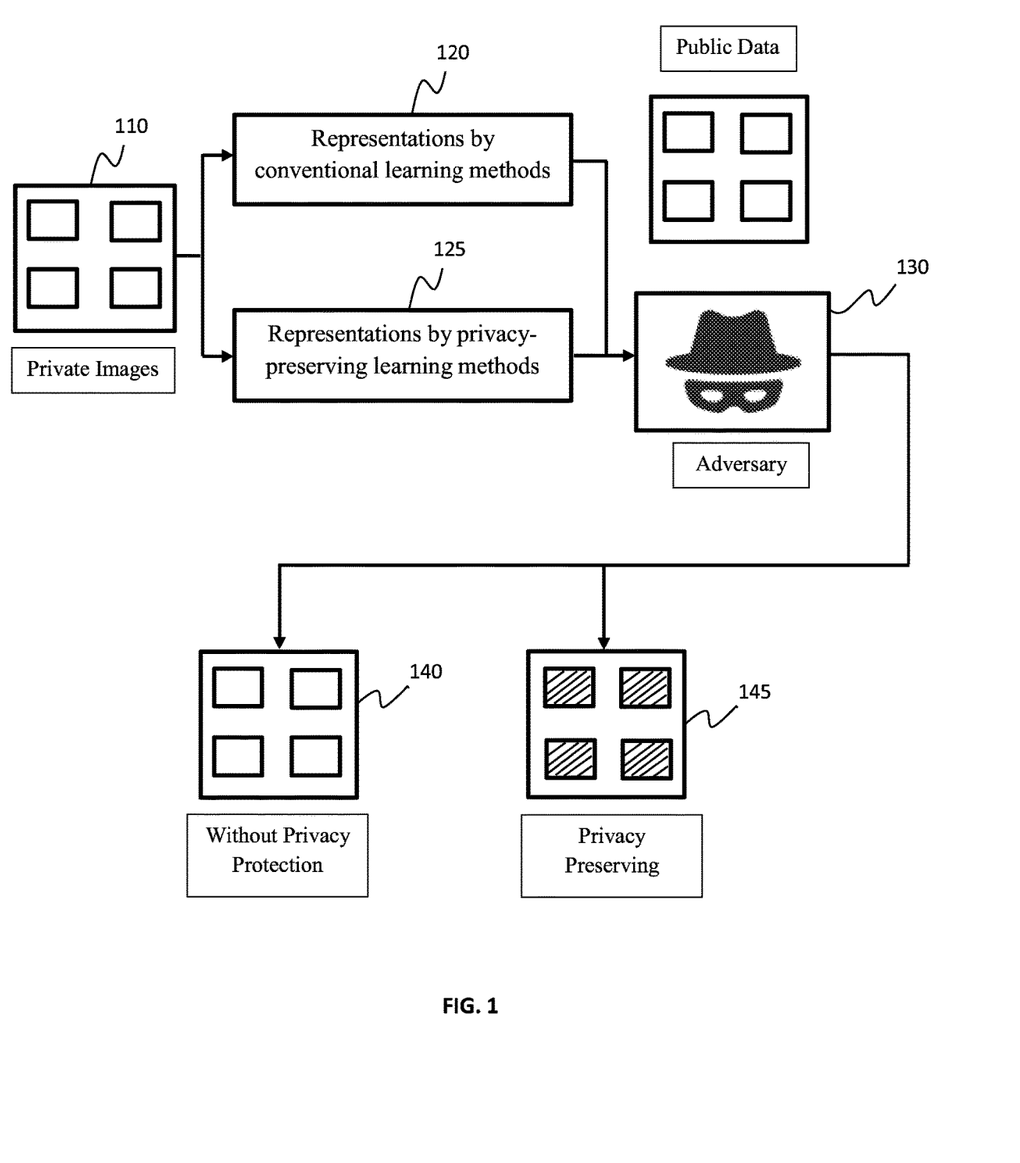
FIG. 1 is a block/flow diagram of a framework for protecting data privacy, in accordance with embodiments of the present invention.

Regarding FIG. 1, representations of conventional deep learning algorithms are vulnerable to an adversary's model inversion attack, which raises issues regarding data privacy. The exemplary embodiments learn task-oriented features while preventing private information being decoded into an input space by simulating the adversary's behavior at a training phase via a negative reconstruction loss. In particular, an adversary 130 can attempt to reconstruct private images 110. By employing conventional learning methods 120, the adversary can reconstruct the images 140, which may be of acceptable quality. However, if the exemplary privacy-preserving methods 125 of the present invention are employed, the adversary 130 will reconstruct images 145, which will be severely or completely obstructed and not usable by the adversary 130.

Therefore, the exemplary embodiments of the present invention identify an adversarial reconstruction learning framework that prevents the latent representations being decoded into original input data. By simulating the expected behavior of the adversary, the exemplary framework is realized by minimizing the negative pixel reconstruction loss or the negative feature reconstruction (e.g., perceptual similarity) loss.

Figure 2:
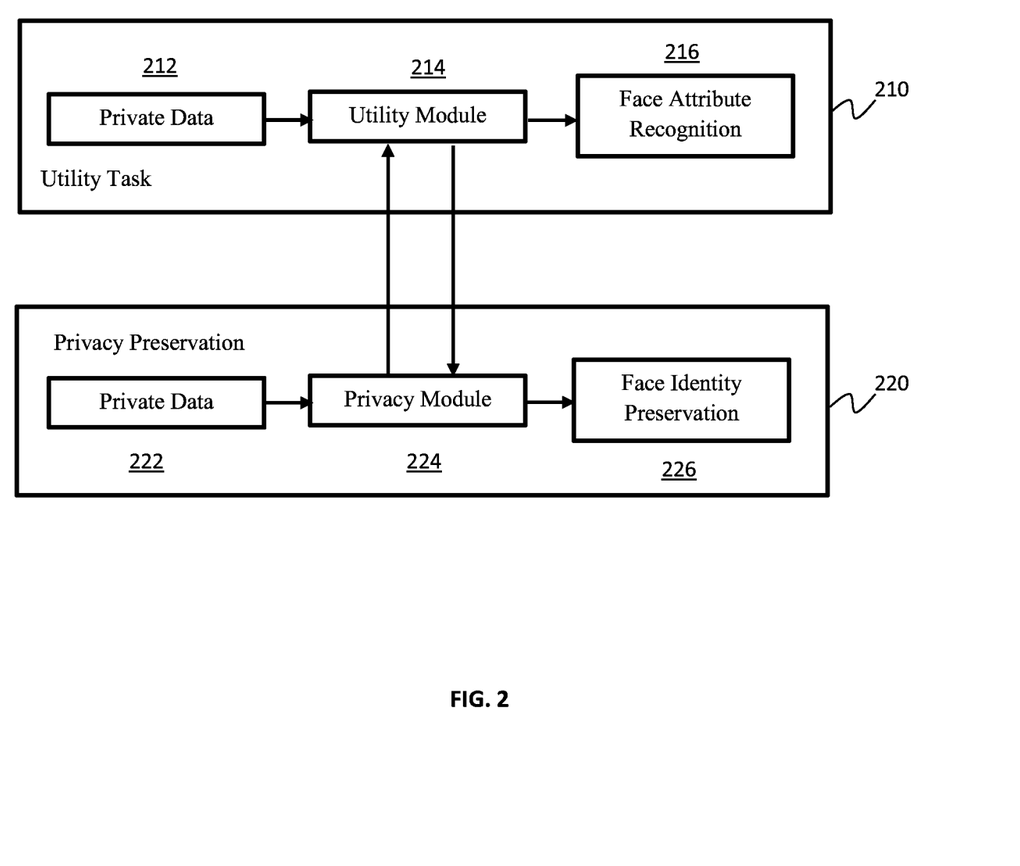
FIG. 2 is a block/flow diagram for preventing feature representation reconstruction, in accordance with embodiments of the present invention.

Regarding FIG. 2, one way to prevent the adversary 130 from hacking the private information 110 is to store the data as feature representations instead of raw images. However, conventional methods 120 learn features without protecting the private information 110. As such, the adversary 130 could potentially reconstruct images from stored features to reveal the private information. In the exemplary embodiments of the present invention, the goal is to prevent the features from reconstruction to visually sensitive images, and thus protect visual privacy. Considering real applications, one example is to perform a utility task 210 on the private data 212 passed through a utility module 214 for face attribution recognition 216. In the meantime, the exemplary embodiments of the present invention protect the privacy (privacy preservation 220) of these private face images 222 by employing the privacy module 224 that communicates with the utility module 214 to preserve the identity (face identity preservation 226) from being hacked by the third party or adversary 130.

Figure 3:
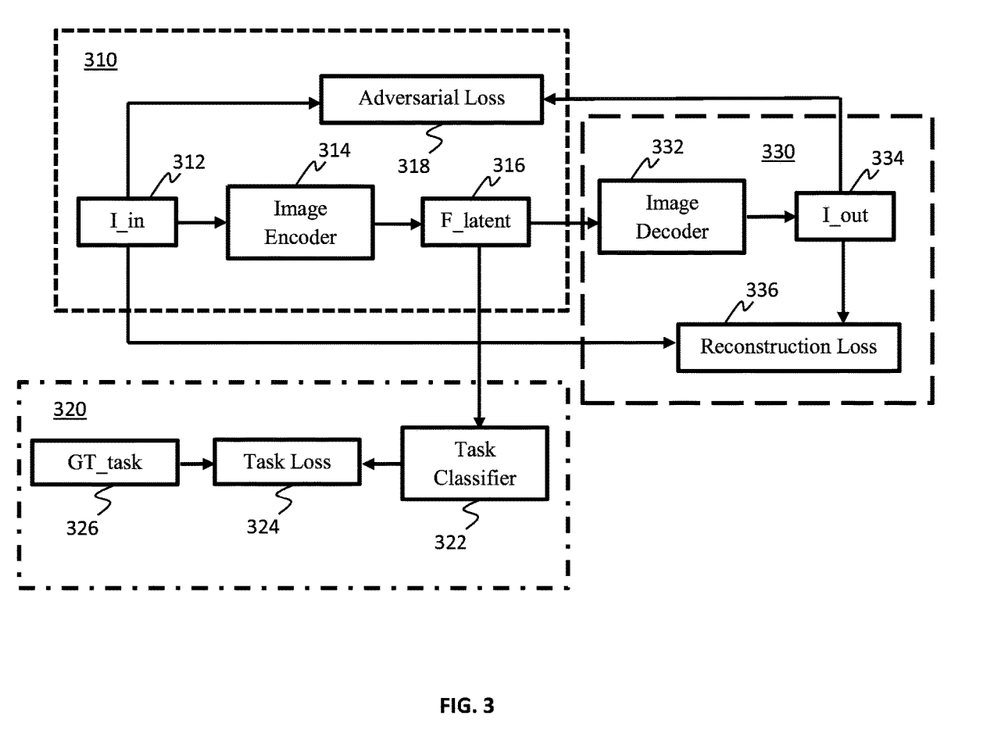
FIG. 3 is a block/flow diagram of a convolutional neural network (CNN) employing an adversarial learning step, in accordance with embodiments of the present invention.

Regarding FIG. 3, in the image encoder 310, first, the input image (I_in) 312 is fed into the image encoder 314 to obtain a latent feature (F_latent) 316, in which this feature can be transmitted and stored on the cloud for further processing. To protect the privacy information included in this latent feature, the exemplary embodiments adopt an adversarial learning step (Adversarial Loss 318) by considering that the reconstructed output image I_out 332 (introduced in block 330) from F_latent 316 should not be the same as the original image (I_in) 312.

Regarding the utility network 320 for the target task, given the latent feature F_latent 316, the exemplary model (Task Classifier 322) aims to perform the target task by calculating the loss function (Task Loss 324) with respect to the target ground truth annotations (GT_task 326).

Regarding the image decoder 332, given the latent feature F_latent 316, the goal of the encoder (Image Encoder 314) is to reconstruct an output image (I_out 334) from the feature via the loss function (Reconstruction Loss 336). This step simulates the procedure when the hacker or adversary 130 obtains a latent feature and tries to decode the latent feature back to the original RGB space that includes the privacy information. To prevent this from occurring, the Adversarial Loss 318 in block 310 is utilized to de-reconstruct this procedure.

Regarding FIGS. 4 and 5, an overview of the privacy-preserving representation learning method with adversarial data reconstruction is identified. In FIG. 4, system 400 depicts decoder 332 (Dec) that is trained to reconstruct an input X from latent encoding $Z=Enc(X)$ on public data $X_2$. Then, in FIG. 5, system 500, the exemplary embodiments update the Enc 314 on private data $X_1$ to generate output Z that fools or tricks the Dec 332, e.g., prevent reconstructing of the input X by Dec 332, while achieving utility prediction performance via the classifier f.

Therefore, the exemplary method is developed by simulating the adversary's expected behavior for the model inversion attack and is realized by alternatively updating the Enc and Dec networks.

In summary, the exemplary embodiments of the present invention learn latent feature representations that include less privacy information, while these features are still capable of being performed by the target task. In this way, each raw data can be encoded as one latent feature and is transmitted to the cloud for processing without being afraid of attacks from hackers or adversaries. One challenge is that one can still try to decipher the latent features back to images for obtaining the privacy information. However, to address this issue, the exemplary embodiments of the present invention identify an adversarial learning framework to learn privacy-preserving feature representations that meet the following conditions: maintaining the utility performance and preventing the features from being decoded back to the original image. Thus, the designed framework not only accounts for the privacy protection on the cloud side by encoding images into latent representations but also considers the hacker's point of view, who tries to reconstruct the latent features back to the images.

Figure 6:
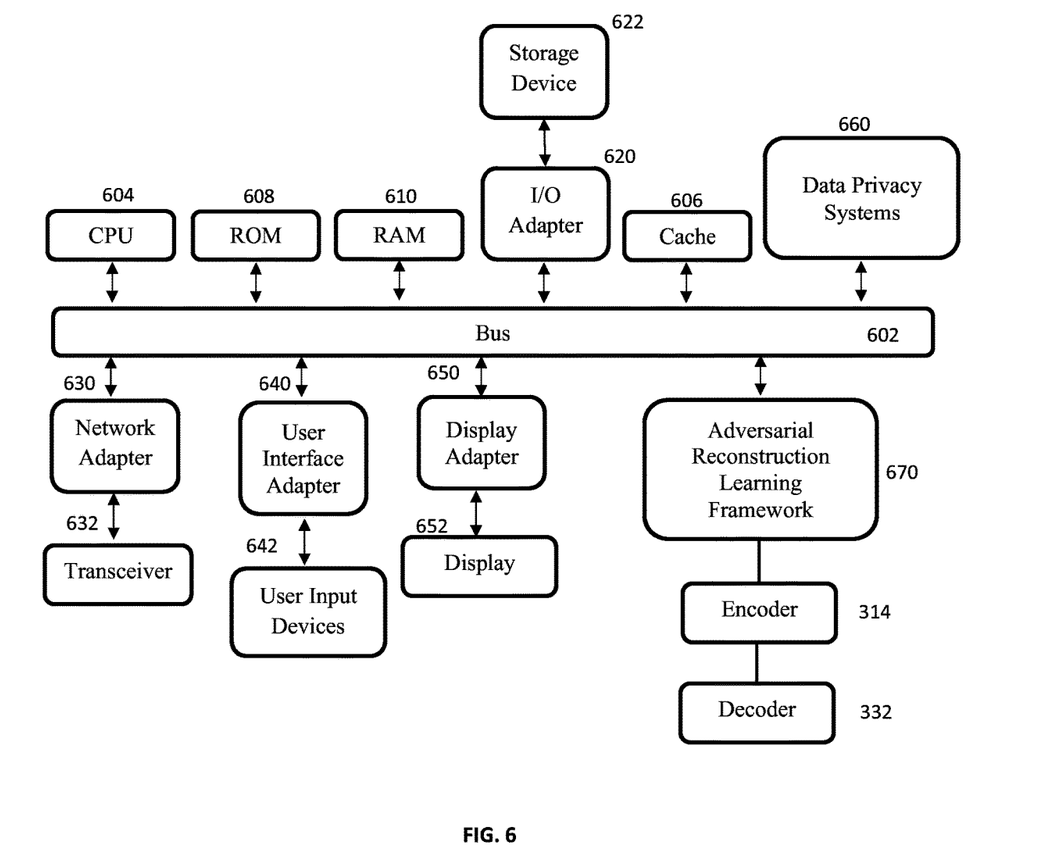
FIG. 6 is block/flow diagram of an exemplary processing system for protecting visual private data by preventing data reconstruction from latent representations of deep networks, in accordance with embodiments of the present invention.

FIG. 6 is block/flow diagram of an exemplary processing system for protecting visual private data by preventing data reconstruction from latent representations of deep networks, in accordance with embodiments of the present invention.

The processing system includes at least one processor or processor device (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Data privacy systems 660 can be connected to bus 602. The data privacy systems 660 can employ an adversarial reconstruction learning framework 670 to by employing an encoder 314 and a decoder 332.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 750.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
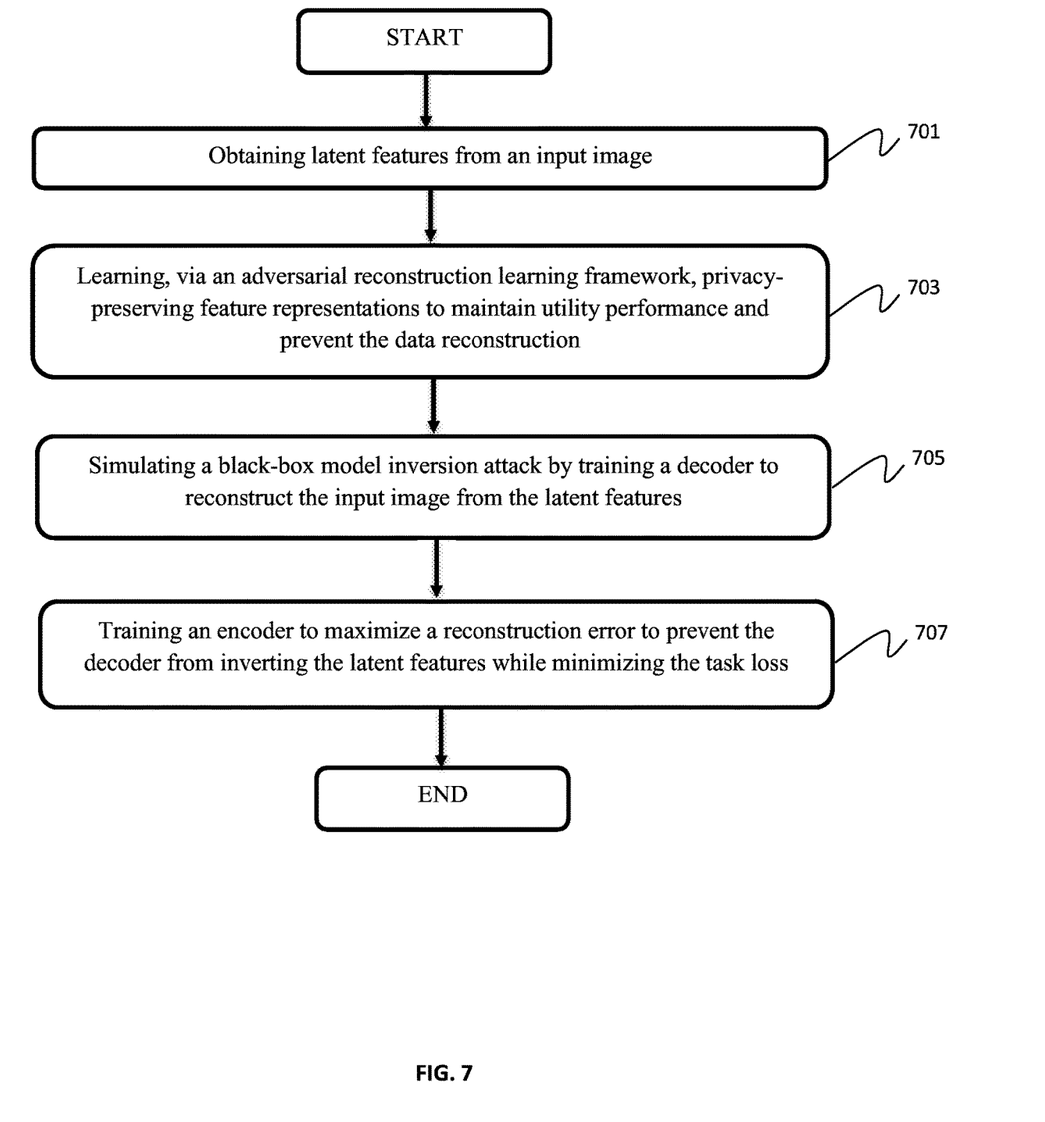
FIG. 7 is a block/flow diagram of an exemplary method for protecting visual private data by preventing data reconstruction from latent representations of deep networks, in accordance with embodiments of the present invention.

FIG. 7 is a block/flow diagram of an exemplary method for protecting visual private data by preventing data reconstruction from latent representations of deep networks, in accordance with embodiments of the present invention.

At block 701, latent features are obtained from an input image.

At block 703, privacy-preserving feature representations are learned via an adversarial reconstruction learning framework to maintain utility performance and prevent the data reconstruction.

At block 705, the data reconstruction is prevented by simulating a black-box model inversion attack by training a decoder to reconstruct the input image from the latent features.

At block 707, the data reconstruction is further prevented by training an encoder to maximize a reconstruction error to prevent the decoder from inverting the latent features while minimizing the task loss.

Figure 8:
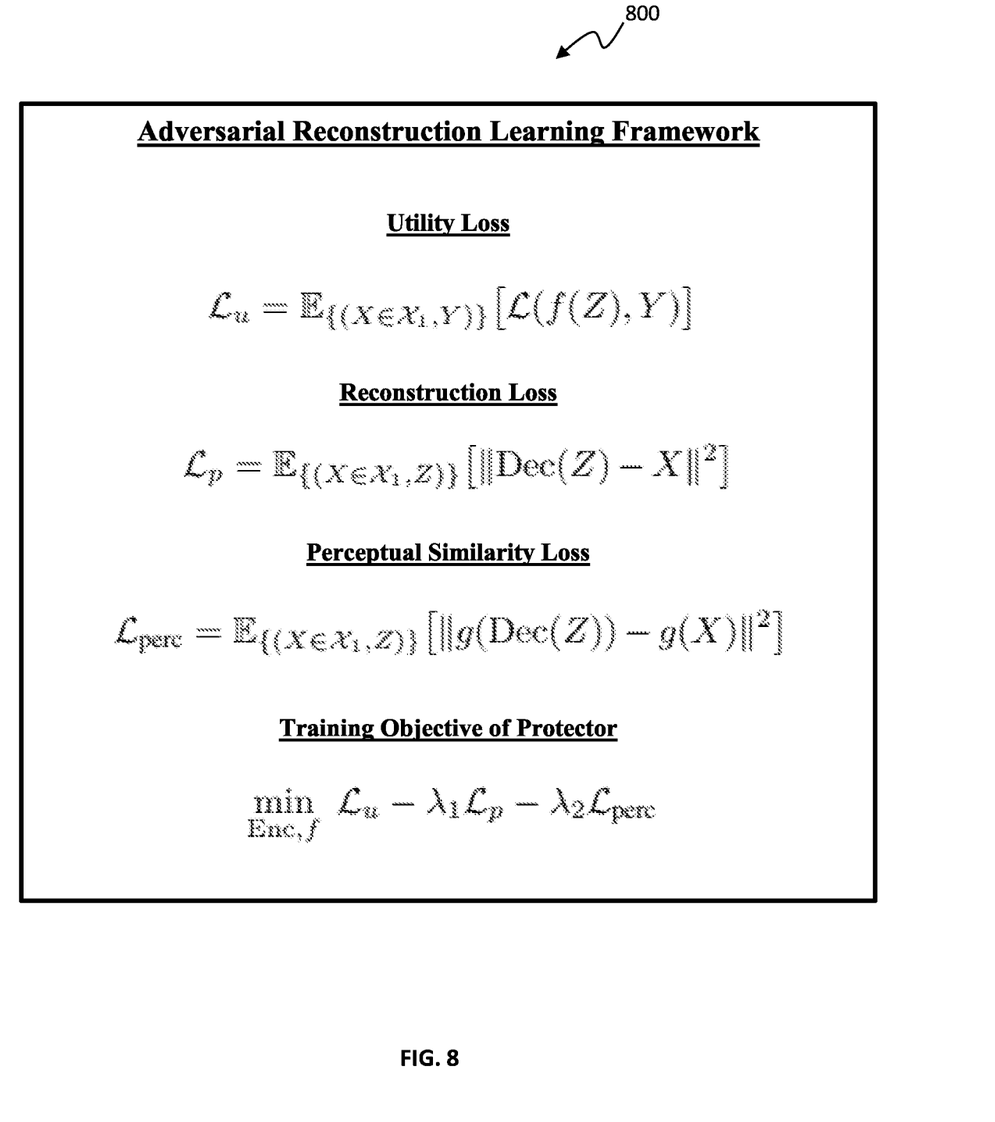
FIG. 8 is a block/flow diagram of exemplary equations employed in an exemplary adversarial reconstruction learning framework, in accordance with embodiments of the present invention.

FIG. 8 is a block/flow diagram of exemplary equations employed in adversarial reconstruction learning framework, in accordance with embodiments of the present invention.

Equations 800 identify how the overall taring objective of the protector is obtained.

In summary, the exemplary embodiments of the present invention identify an adversarial learning framework to learn intermediate latent representations rather than transformations in the image space to preserve visual data privacy. The exemplary framework is developed from both adversary's and protector's perspectives, which can be viewed as a min-max game between utility and privacy. By adopting an alternative update strategy, the exemplary framework learns privacy-preserving and task-oriented representations. Thus, the latent feature space is used not only as a form to efficiently represent each image, but also to preserve the privacy information. By employing the adversarial signal from the image decoder, the exemplary framework effectively hides sensitive information if the hacker intends to reconstruct the image from the latent feature space. In addition, the exemplary framework can still achieve competitive performance for the utility task.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for protecting visual private data by preventing data reconstruction from latent representations of deep networks, the method comprising:
    obtaining latent features from an input image; and
    learning, via an adversarial reconstruction learning framework, privacy-preserving feature representations to maintain utility performance and prevent the data reconstruction by:
        simulating a black-box model inversion attack by training a decoder to reconstruct the input image from the latent features; and
        training an encoder to maximize a reconstruction error to prevent the decoder from inverting the latent features while minimizing the task loss.

2. The method of claim 1, wherein the latent features are transmitted and stored on a cloud for further processing.

3. The method of claim 1, wherein the adversarial reconstruction learning framework adopts a multilayer perceptron (MLP) classifier that predicts a utility label by minimizing a utility loss.

4. The method of claim 3, wherein the utility loss is given by:

$$\mathcal{L}_u = \mathbb{E}_{\{(X \in \chi_1, Y)\}}[\mathcal{L}(f(Z), Y)],$$

where f(Z)=f(Enc(X)), Y is a ground-truth label for utility, $\mathcal{L}$ is a standard loss for utility, X is an input, and $\chi_1$ is private training data.

5. The method of claim 4, wherein the decoder is trained to compete against the encoder such that the decoder learns to decode an output of the encoder by minimizing a reconstruction loss.

6. The method of claim 5, wherein the reconstruction loss is given by:

$$\mathcal{L}_p = \mathbb{E}_{\{(X \in \chi_1, Z)\}}[\|Dec(Z) - X\|^2],$$

where X is an input, Z is the output of the encoder, and $\chi_1$ is private training data.

7. The method of claim 6, wherein a quality of reconstruction is modified by employing a perceptual similarity loss given by:

$$\mathcal{L}_{perc} = \mathbb{E}_{\{(X \in \chi_1, Z)\}}[\|g(Dec(Z)) - g(X)\|^2],$$

where X is an input, Z is the output of the encoder, and $\chi_1$ is private training data.

8. The method of claim 7, wherein an overall training objective of a protector is given by:

$$\min_{Enc, f} \mathcal{L}_u - \lambda_1 \mathcal{L}_p - \lambda_2 \mathcal{L}_{perc},$$

where $\mathcal{L}_u$ is the utility loss, $\mathcal{L}_p$ is the reconstruction loss, and $\mathcal{L}_{perc}$ is the perceptual similarity loss.

9. A non-transitory computer-readable storage medium comprising a computer-readable program for protecting visual private data by preventing data reconstruction from latent representations of deep networks, wherein the computer-readable program when executed on a computer causes the computer to perform the steps of:
  obtaining latent features from an input image; and
  learning, via an adversarial reconstruction learning framework, privacy-preserving feature representations to maintain utility performance and prevent the data reconstruction by:
    simulating a black-box model inversion attack by training a decoder to reconstruct the input image from the latent features; and
    training an encoder to maximize a reconstruction error to prevent the decoder from inverting the latent features while minimizing the task loss.

10. The non-transitory computer-readable storage medium of claim 9, wherein the latent features are transmitted and stored on a cloud for further processing.

11. The non-transitory computer-readable storage medium of claim 9, wherein the adversarial reconstruction learning framework adopts a multilayer perceptron (MLP) classifier that predicts a utility label by minimizing a utility loss.

12. The non-transitory computer-readable storage medium of claim 11, wherein the utility loss is given by:

$$\mathcal{L}_u = \mathbb{E}_{\{X \in \chi_1, Y\}}[\mathcal{L}(f(z), Y)],$$

where f(Z)=f(Enc(X)), Y is a ground-truth label for utility, $\mathcal{L}$ is a standard loss for utility, X is an input, and $\chi_1$ is private training data.

13. The non-transitory computer-readable storage medium of claim 12, wherein the decoder is trained to compete against the encoder such that the decoder learns to decode an output of the encoder by minimizing a reconstruction loss.

14. The non-transitory computer-readable storage medium of claim 13, wherein the reconstruction loss is given by:

$$\mathcal{L}_p = \mathbb{E}_{\{X \in \chi_1, Z\}}[\|Dec(Z) - X\|^2],$$

where X is an input, Z is the output of the encoder, and $\chi_1$ is private training data.

15. The non-transitory computer-readable storage medium of claim 14, wherein a quality of reconstruction is modified by employing a perceptual similarity loss given by:

$$\mathcal{L}_{perc} = \mathbb{E}_{\{X \in \chi_1, Z\}}[\|g(Dec(Z)) - g(X)\|^2],$$

where X is an input, Z is the output of the encoder, and $\chi_1$ is private training data.

16. The non-transitory computer-readable storage medium of claim 15, wherein an overall training objective of a protector is given by:

$$\min_{Enc, f} \mathcal{L}_u - \lambda_1 \mathcal{L}_p - \lambda_2 \mathcal{L}_{perc},$$

where $\mathcal{L}_u$ is the utility loss, $\mathcal{L}_p$ is the reconstruction loss, $\mathcal{L}_{perc}$ and is the perceptual similarity loss.

17. A system for protecting visual private data by preventing data reconstruction from latent representations of deep networks, the system comprising:
  a memory; and
  one or more processors in communication with the memory configured to:
    obtain latent features from an input image; and
    learn, via an adversarial reconstruction learning framework, privacy-preserving feature representations to maintain utility performance and prevent the data reconstruction by:
      simulating a black-box model inversion attack by training a decoder to reconstruct the input image from the latent features; and
      training an encoder to maximize a reconstruction error to prevent the decoder from inverting the latent features while minimizing the task loss.

18. The system of claim 17, wherein the adversarial reconstruction learning framework adopts a multilayer perceptron (MLP) classifier that predicts a utility label by minimizing a utility loss given by:

$$\mathcal{L}_u = \mathbb{E}_{\{X \in \chi_1, Y\}}[\mathcal{L}(f(Z), Y)],$$

where f(Z)=f(Enc(X)), Y is a ground-truth label for utility, $\mathcal{L}$ is a standard loss for utility, X is an input, and $\chi_1$ is private training data.

19. The system of claim 18, wherein the decoder is trained to compete against the encoder such that the decoder learns to decode an output of the encoder by minimizing a reconstruction loss given by:

$$\mathcal{L}_p = \mathbb{E}_{\{X \in \chi_1, Z\}}[\|Dec(Z) - X\|^2],$$

where X is an input, Z is the output of the encoder, and $\chi_1$ is private training data.

20. The system of claim 19, wherein a quality of reconstruction is modified by employing a perceptual similarity loss given by:

$$\mathcal{L}_{perc} = \mathbb{E}_{\{X \in \chi_1, Z\}}[\|g(Dec(Z)) - g(X)\|^2],$$

where X is an input, Z is the output of the encoder, and $\chi_1$ is private training data.

* * * * *